C. C. CARPENTER.
RELIEF MECHANISM FOR STORAGE BATTERIES.
APPLICATION FILED FEB. 25, 1918.

1,403,539.

Patented Jan. 17, 1922.

WITNESS:

INVENTOR.
Campbell C. Carpenter
BY
ATTORNEY.

UNITED STATES PATENT OFFICE.

CAMPBELL C. CARPENTER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

RELIEF MECHANISM FOR STORAGE BATTERIES.

1,403,539.  Specification of Letters Patent.  Patented Jan. 17, 1922.

Application filed February 25, 1918. Serial No. 218,961.

*To all whom it may concern:*

Be it known that I, CAMPBELL C. CARPENTER, a citizen of the United States, residing at Niagara Falls, in the county of Niagara and State of New York, have invented new and useful Improvements in Relief Mechanism for Storage Batteries, of which the following is a specification.

The present invention relates to relief mechanism for storage batteries.

More particularly the present invention relates to means whereby gases may escape from the interior of a storage battery cell but which will prevent the escape of electrolyte should the cell be tilted to such a degree that the electrolyte would tend to escape. The invention is particularly applicable to portable storage battery cells or cells carried on aeroplanes which, in practice, are often tilted out of their normal positions. Various means have been evolved for ventilating storage batteries while preventing the escape of electrolyte, which means are usually located substantially centrally of the cell cover. Such means operate to close the cell to prevent the escape of electrolyte upon the tilting of said cell at a relatively small angle.

The present invention has for one of its objects the provision of means for ventilating a storage battery cell and preventing the escape of electrolyte at all times, though permitting the escape of gases from the interior of the cell when the cell is tilted at a relatively great angle.

A further object is to provide means for accomplishing the above mentioned object which are simple to construct and effectual in operation.

Further objects will be apparent as the description proceeds.

Figure 2:
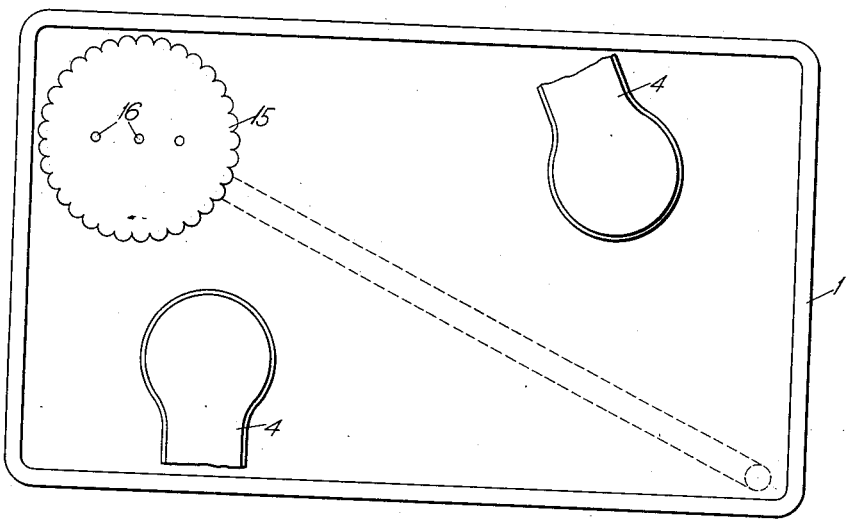
Figure 1:
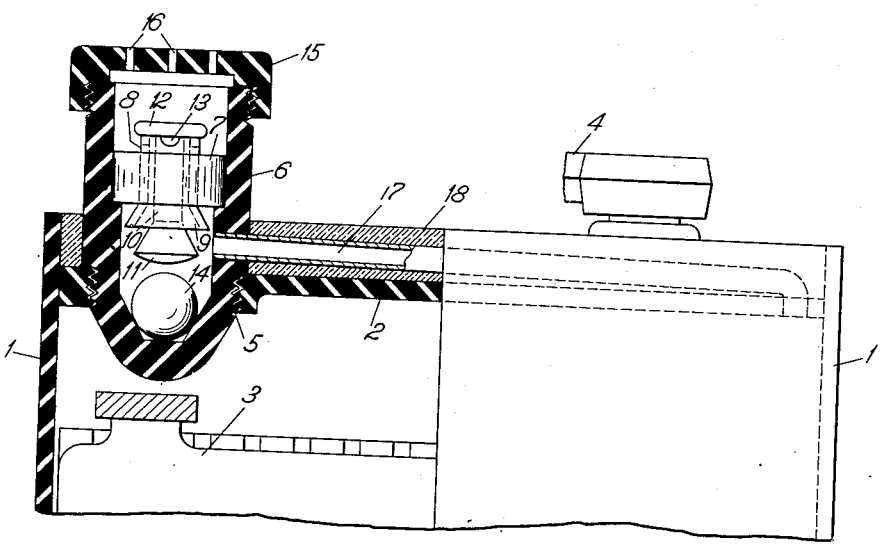

Figures 1 and 2 represent in sectional elevation and plan respectively, one embodiment of the present invention.

The present invention has been illustrated in connection with a storage battery cell having a rectangular outline, for the reason that most cells in commercial use have such outline. As will be understood from the description which follows, however, the invention is applicable to cells having an outline other than rectangular.

The numeral 1 indicates the walls of the storage battery cell. Suitably mounted upon said walls is a cover 2 adapted to be sealed to said walls to prevent the escape of electrolyte therebetween. The active elements within the walls 1 of the cell are indicated as a whole by the numeral 3. The details of the active elements 3 and the means by which said active elements have electrical communication with the exterior of the cell, form no part of the present invention and need not be described herein. It will be sufficient to state that said active elements may be connected to the exterior of the cell through straps 4, 4.

The cover 2 may be provided with a suitable screw-threaded aperture 5 extending therethrough, into which may be screwed a valve member 6. The valve member 6 should be so intimately connected to the cover 2 as to prevent the escape of electrolyte therebetween. If preferred, any other means than screw-threads may be utilized for attaching the valve member 6. The details of the valve member 6 form no part of the present invention, but in order that the present invention may be readily understood, one form of valve member will be briefly described, which will be found useful in practice. The valve member 6 illustrated, comprises a cylindrical member mounted on the cover 2 so that its axis is normally vertical. Mounted within the valve member 6 is a bushing 7 which carries a cylinder member 8 having a flared mouth portion 9. Mounted to move within the cylinder 8 is a plunger 10, having a head 11 adapted to fit within the mouth portion 9 and form a closure for said mouth portion 9. The upper end of plunger 10 may be provided with a shoulder 12 which may rest on the upper end of the cylinder 8. The plunger 10 should be of smaller diameter than the bore of the cylinder 8, whereby to readily permit passage of gases between said plunger and said cylinder. The upper end of the cylinder 8 may be provided with fillets 13 whereby ready communication may be had for gases from the under side of the bushing 7 to the upper side thereof, when the plunger occupies its lowermost position. The bottom portion of the valve member 6 may constitute a cup-shaped receptacle for holding a ball 14. The upper end of the valve member 6 may be provided with a cover 15 having apertures 16, 16, whereby to permit the escape of gases from within the valve member 6 while preventing the entrance of foreign material. It need only be explained that when the cell is tilted to a predetermined degree, the ball 14 will move against the head 11 of the plunger 10, moving said head 11 into closing position within the mouth 9, thereby effectually preventing the escape of electrolyte between plunger 10 and cylinder 8. When the cell is again moved to a position whereby the ball 14 will roll away from the head 11, the plunger 10 will drop, again permitting the access of the gases from the underside to the upper side of the bushing 7.

The valve member 6 should be located adjacent to one corner of the cover 2. Extending from the interior of the valve member 6, below the bushing 7 and extending to a point adjacent the corner of the cover 2 which is diagonally placed with reference to the valve member 6, is a tube 17. Said tube should have access to the interior of the cell at its end removed from the valve member 6. Sealing compound 18 may be applied to the upper side of the cover 2, completely enveloping the tube 17, and tightly sealing the wall 1, cover 2 and tube 17, whereby to prevent any undesirable escape of gases or electrolyte, and also protecting the tube 17 against injury.

It will be clear from the drawing and from the description above that the only path from the interior to the exterior of the cell for either gases or electrolyte, is through the diagonally arranged tube 17 and valve member 6. It will be clear that it will be impossible for any electrolyte to escape from the cell until said cell is tilted at such an angle that the tube 17 lies below the level of the electrolyte. The angles of the cup-shaped portion upon which the ball 14 rests may be so designed that said ball 14 will not operate to close the valve member 6 until such predetermined angle is reached. It will be apparent that the cell may be tilted at an angle of almost 90 degrees in any direction from the vertical, before the tube 17 will be entirely below the level of the electrolyte. While the cell is inclined at an angle less than this predetermined angle, gases may escape from the cell and at the same time the escape of electrolyte will not occur. Should said predetermined angle be exceeded, the valve member 6 will be closed, whereby to effectually prevent the escape of electrolyte. Though the tube 17 will contain electrolyte when the cell is tipped at certain angles, said electrolyte will run back into the cell when said cell is again returned to its normal vertical position. Though a certain amount of electrolyte may collect around the ball 14, said electrolyte will do no harm and will run back through tube 17 when the cell is tipped at certain angles.

One embodiment of the present invention has been described in detail. Many modifications will occur to those skilled in the art. It is intended in this patent to cover all such modifications that come within the scope of the present invention as defined by the appended claims.

What I claim as new and desire to secure by Letters Patent of the United States is—

1. In combination, a storage battery cell having cell walls and a cover and a tube mounted on said cover arranged diagonally of said cover providing a passage-way from the interior to the exterior of said cell, said cover being provided with a layer of sealing material enveloping said tube to seal the connection between said cover and walls and to protect said tube from injury.

2. In combination, a storage battery cell having cell walls, a cover and a tube, said cell being tightly closed except through said tube, said tube being arranged in proximity to said cover and extending between diagonally opposite points of said cover, said tube being imperforate except at said points, said tube providing a passage-way from the interior to the exterior of said cell.

3. In combination, a storage battery cell having cell walls, a cover and means providing a passage-way from the interior to the exterior of said cell, said cell being otherwise tightly closed, said means including a valve member adapted to close said passage-way when said cell is tilted at a predetermined angle to its normal position, and tube means opening to the interior of said cell and to the exterior thereof at remote points.

4. In combination, a storage battery cell having cell walls, a cover and means providing a passage-way from the interior to the exterior of said cell, said cell being otherwise tightly closed, said means including a valve member located adjacent to one of said cell walls and adapted to close said passage-way when said cell is tilted at a predetermined angle to its normal position, and a tube communicating with said valve member and with the interior of said cell at a point remote from said valve member and substantially symmetrically arranged therewith with reference to said cell.

5. In combination, a storage battery cell of substantially rectangular outline having cell walls, a cover and means providing a passage-way from the interior to the exterior of said cell, said cell being otherwise tightly closed, said means including a valve member located adjacent to one edge of said cell and adapted to close said passage-way when said cell is tilted at a predetermined angle to its normal position, and a tube communicating with said valve member and with the interior of said cell at a point remote from said valve member and symmetrically arranged therewith with reference to said cell.

6. In combination, a storage battery cell having cell walls, a cover and means providing a passage-way from the interior to the exterior of said cell, said cell being otherwise tightly closed, said passage-way communicating with the interior of said cell and with the exterior thereof at points remote from one another, and a valve adapted to close said passage-way when said cell is tilted at a predetermined angle.

7. In combination, a storage battery cell of substantially rectangular outline having cell walls, a cover and means providing a passage-way from the interior to the exterior of said cell, said cell being otherwise tightly closed, said passage-way communicating with the interior of said cell and with the exterior thereof at points located adjacent to diagonally opposite edges of said cell.

8. In combination, a storage battery cell having cell walls, a cover and a tube, said cell being tightly closed except through said tube, said tube being arranged in proximity to said cover and extending between remote points of said cell, said tube being provided with a valve adapted to prevent the passage of liquid through said tube when said cell is tilted at a predetermined angle.

In witness whereof, I have hereunto subscribed my name.

CAMPBELL C. CARPENTER.